(12) United States Patent
Abraham et al.

(10) Patent No.: US 7,719,576 B2
(45) Date of Patent: May 18, 2010

(54) METHOD AND APPARATUS FOR TAGGING DIGITAL PHOTOGRAPHS WITH GEOGRAPHIC LOCATION DATA

(75) Inventors: Charles Abraham, Los Gatos, CA (US); Sergei Podshivalov, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 241 days.

(21) Appl. No.: 10/868,172

(22) Filed: Jun. 14, 2004

(65) Prior Publication Data

US 2005/0275726 A1   Dec. 15, 2005

(51) Int. Cl.
H04N 5/228     (2006.01)
H04N 15/76    (2006.01)

(52) U.S. Cl. .................. 348/222.1; 348/231.2; 713/176

(58) Field of Classification Search .............. 348/222.1, 348/231.2
See application file for complete search history.

(56) References Cited

U.S. PATENT DOCUMENTS

| | | | |
|---|---|---|---|
| 6,133,871 A | 10/2000 | Krasner | |
| 6,133,947 A * | 10/2000 | Mikuni | 348/143 |
| 6,140,958 A * | 10/2000 | Johnson et al. | 342/357.09 |
| 6,151,353 A | 11/2000 | Harrison et al. | |
| 6,225,945 B1 * | 5/2001 | Loomis | 342/357.12 |
| 6,259,401 B1 * | 7/2001 | Woo | 342/357.12 |
| 6,282,362 B1 | 8/2001 | Murphy et al. | |
| 6,437,797 B1 * | 8/2002 | Ota | 345/638 |
| 6,462,778 B1 * | 10/2002 | Abram et al. | 348/239 |
| 6,546,040 B1 * | 4/2003 | Eschenbach | 375/140 |
| 6,547,456 B2 | 4/2003 | Wechsler et al. | |
| 6,701,079 B1 | 3/2004 | Bojan | |
| 7,002,625 B2 * | 2/2006 | Takahashi | 348/231.2 |
| 7,010,144 B1 * | 3/2006 | Davis et al. | 382/100 |
| 2001/0040627 A1 * | 11/2001 | Obradovich | 348/222 |
| 2002/0186307 A1 * | 12/2002 | Anderson | 348/231.99 |

OTHER PUBLICATIONS

*International Search Report* mailed Oct. 23, 2006 for PCT Application No. PCT/US05/20879.
*Written Opinion* mailed Oct. 23, 2006 for PCT Application No. PCT/US05/20879.

* cited by examiner

*Primary Examiner*—Sinh Tran
*Assistant Examiner*—Hung H Lam
(74) *Attorney, Agent, or Firm*—McAndrews Held & Malloy, Ltd.

(57) ABSTRACT

A method and apparatus for tagging digital photographs with geographic location data is described. In one example, a digital camera includes an imaging unit, a radio frequency/intermediate frequency (RF/IF) front end, and a memory. The imaging unit is configured to generate digital photographs. The RF/IF front end is configured to receive satellite positioning system signals and generate digital samples therefrom. The memory is configured to store a set of digital samples generated by the RF/IF front end with each digital photograph generated by the imaging unit. The digital samples produced by the RF/IF front end may be intermediate frequency samples and may include both in-phase samples and quandrature samples. Notably, the memory stores digital samples of GPS signals, rather than location data. The digital GPS samples may be processed by an off-line processing unit, such as a computer, to produce location data.

16 Claims, 6 Drawing Sheets

METHOD AND APPARATUS FOR TAGGING DIGITAL PHOTOGRAPHS WITH GEOGRAPHIC LOCATION DATA

BACKGROUND OF THE INVENTION

1. Field of the Invention

The present invention generally relates to digital photograph systems and, more particularly, to tagging digital photographs with geographic location data.

2. Description of the Related Art

Global Positioning System (GPS) devices use measurements from several satellites to compute position. GPS devices normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

The time delays between transmission and reception of the signals may be determined by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS device.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time" or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

Another time parameter closely associated with GPS positioning is the sub-millisecond offset in the time reference used to measure the sub-millisecond pseudorange. This offset affects all the measurements equally, and for this reason it is known as the "common mode error". The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. A common mode error of 1 microsecond, however, results in a pseudorange error of 1 microsecond multiplied by the speed of light (i.e., 300 meters). Common mode errors have a large effect on pseudorange computations, and it is in practice, very difficult to calibrate the common mode error. As such, traditional GPS receivers treat the common mode error as an unknown that must be solved for, along with position, once a sufficient number of pseudoranges have been measured at a particular receiver.

With the advent of GPS, there is a growing demand to incorporate location-determination capability into various portable electronic devices, such as digital cameras. Traditional GPS receivers have been coupled to digital cameras for the purpose of determining location. However, such GPS receivers are employed to locate position of the digital camera. The position determination process is time-consuming and requires significant processing within the digital camera.

Accordingly, there exists a need in the art for a method and apparatus that tags digital photographs with geographic location data without locating position at a digital camera.

SUMMARY OF THE INVENTION

A method and apparatus for tagging digital photographs with geographic location data is described. In one embodiment, a digital camera includes an imaging unit, a radio frequency/intermediate frequency (RF/IF) front end, and a memory. The imaging unit is configured to generate digital photographs. The RF/IF front end is configured to receive satellite positioning system signals and generate digital samples therefrom. The memory is configured to store a set of digital samples generated by the RF/IF front end with each digital photograph generated by the imaging unit. The digital samples produced by the RF/IF front end may be intermediate frequency samples and may include both in-phase samples and quandrature samples. Notably, the memory stores digital samples of GPS signals, rather than location data. The digital GPS samples may be processed by an off-line processing unit, such as a computer, to produce location data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

A method and apparatus for tagging digital photographs with geographic location data is described. One or more aspects of the invention are described with respect to a digital camera capable of capturing still digital photographs. Those skilled in the art will appreciate, however, that the invention may be adapted for use with other types of digital cameras, such as digital video cameras and the like.

Figure 1:
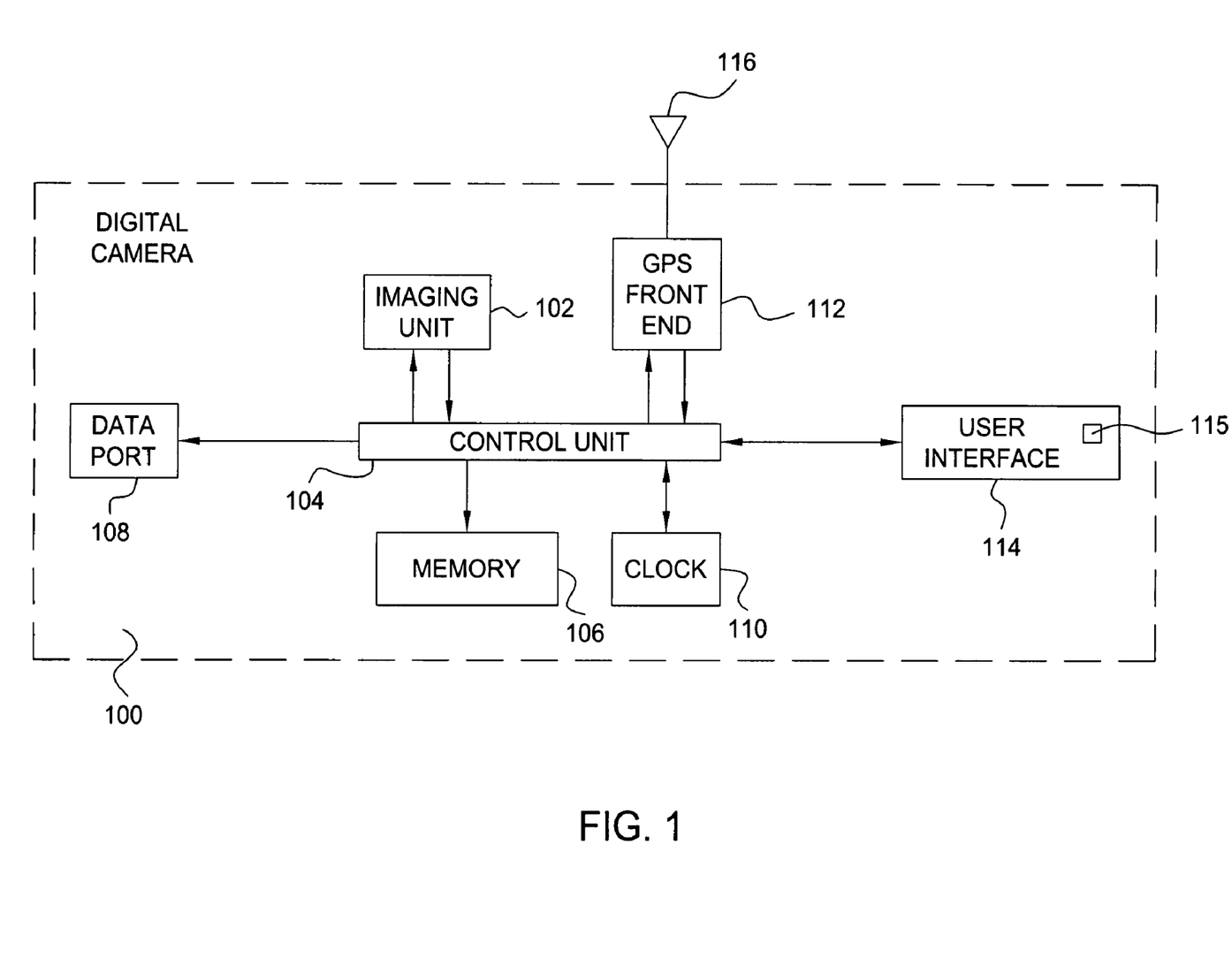
FIG. 1 is a block diagram depicting an exemplary embodiment of a digital camera constructed in accordance with one or more aspects of the invention.
Figure 2:
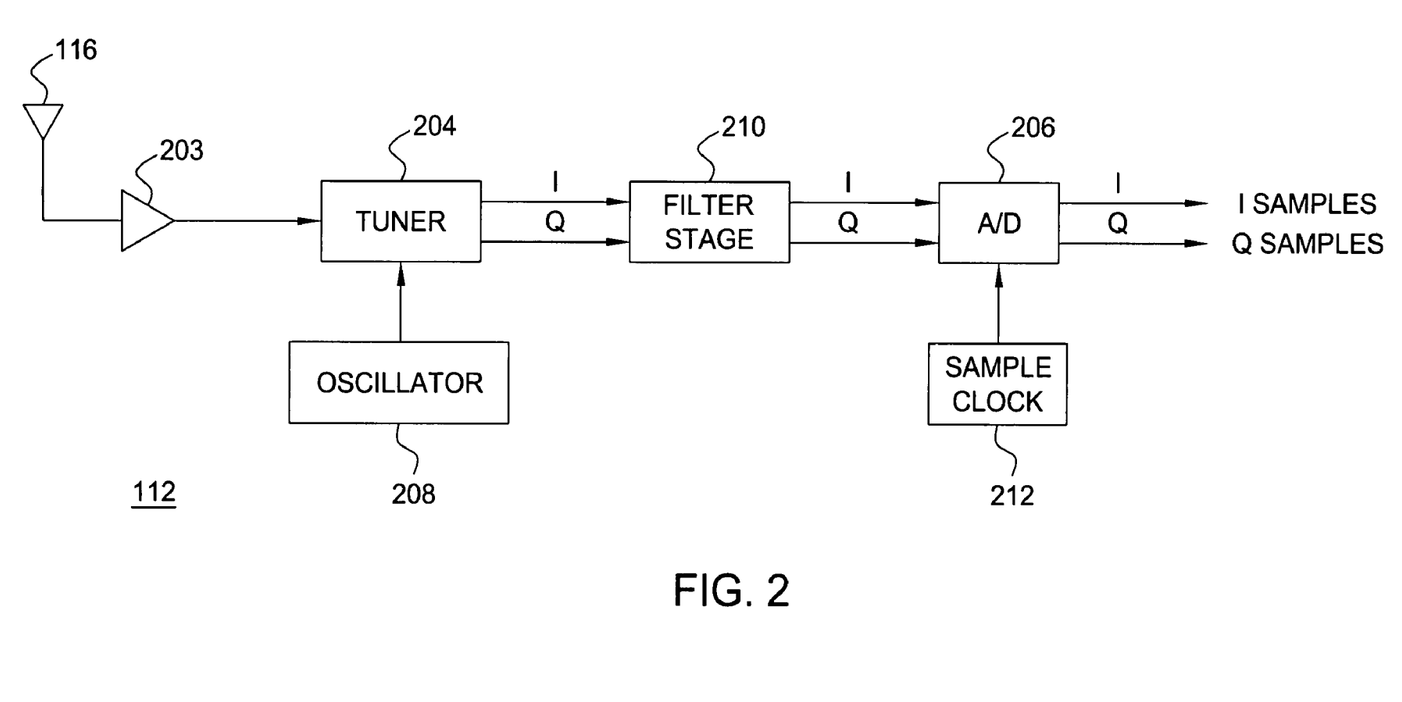
FIG. 2 is a block diagram depicting an exemplary embodiment of the GPS front end of FIG. 1.

FIG. 1 is a block diagram depicting an exemplary embodiment of a digital camera 100 constructed in accordance with one or more aspects of the invention. The digital camera 100 includes an imaging unit 102, a control unit 104, memory 106, a data port 108, a clock 110, a GPS front end 112, an antenna 116, and a user interface 114. Data and control interfaces of the imaging unit 102 are coupled to the control unit 104. The imaging unit 102 may comprise a conventional charge-coupled device (CCD) array for producing electronic image data. Data and control interfaces of the GPS front end 112 are coupled to the control unit 104. The GPS front end 112 generates digital samples of GPS signals received via the antenna 116. An exemplary embodiment of the GPS front end 112 is shown in FIG. 2. The control unit 104 may comprise a microprocessor, an instruction-set processor (e.g., microcontroller), or like type processing element known in the art. Alternatively, the control unit 104 may comprise discrete circuitry, logic embedded in an integrated circuit (IC), such as an application specific integrated circuit (ASIC), or logic configured in a programmable logic device (PLD), such as a field programmable gate array (FPGA).

Interfaces of the control unit 104 are coupled to the data port 108, the user interface 114, and the memory 106. The data port 108 is configured to provide external access to the memory 106 through the control unit 104. Alternatively, the data port 108 may be configured with direct access to the memory 106. In either case, the data port 108 may comprise any of the various wired or wireless communications ports known in the art, such as a serial port, a universal serial bus (USB) port, an IEEE 1394 Firewire port, an infrared port (e.g., Infrared Data Association (IrDA) port), and a radio frequency (RF) port (e.g., BLUETOOTH port). The user interface 114 is configured to receive commands from a user of the digital camera 100. Notably, the user interface 114 includes a shutter button 115 for causing the capture of a digital photograph. The memory 106 may include one or more of random access memory (RAM), magneto-resistive read/write memory, optical read/write memory, cache memory, magnetic read/write memory, and the like. Notably, the memory 106 may comprise flash memory, as is well known in the art.

In operation, instruction data produced by the user interface 114 is received by the control unit 104. In response to the instruction data, the control unit 104 couples control signals to the control interfaces of the imaging unit 102 and the GPS front end 112. The instruction data may comprise a specific instruction to the imaging unit 102 to capture a digital photograph or a specific instruction to the GPS front end 112 to capture digital samples of GPS signals. Alternatively, the instruction data may comprise a single instruction that causes both the imagining unit 102 to capture a digital photograph and the GPS front end 112 to capture digital samples of GPS signals. For example, activation of the shutter button 115 may cause the capture of a digital photograph by the imaging unit 102 and capture of GPS signals by the GPS front end 112.

The electronic image data defining the digital photograph is stored within the memory 106 via the data interface of the imaging unit 102 and the control unit 104. Alternatively, the electronic image data may be directly coupled to the memory 106 from the imaging unit 102. Digital signal samples of the GPS signals are stored within the memory 106 via the data interface of the GPS front end 112 and the control unit 104. Alternatively, the digital signal samples may be directly stored within the memory 106 from the GPS front end 112.

FIG. 2 is a block diagram depicting an exemplary embodiment of the GPS front end 112 of FIG. 1. The GPS front end 112 illustratively comprises an amplifier 203, a tuner 204, an oscillator 208, a filter stage 210, an analog-to-digital (A/D) converter 206, and a sample clock 212. An input interface of the amplifier 203 is coupled to the antenna 116. An output interface of the amplifier 203 is coupled to the tuner 204. The amplifier 203 is configured to amplify GPS signals received by the antenna 116 before processing by the tuner 204. The amplifier 203 may comprise a low-noise amplifier (LNA), for example Another input interface of the tuner 204 is coupled to an output interface of the oscillator 208. The tuner 204 frequency shifts (e.g., downconverts) the GPS signals to an intermediate frequency (IF) in response to a local oscillator (LO) signal generated by the oscillator 208. In one embodiment, the tuner 204 may comprise a quadrature mixer that produces both in-phase (I) and quadrature (Q) output signals. Alternatively, the tuner 204 may produce narrow-band output signals. The oscillator 208 may comprise any type of oscillator known in the art, such as a temperature controlled crystal oscillator (TCXO). Operation of the tuner 204 and the oscillator 208 is well-known in the art.

An output interface of the tuner 204 is coupled to an input interface of the filter stage 210. The filter stage 210 may comprise a combination of high-pass and low-pass filters (or a bandpass filter) for removing DC components and image components generated by the tuner 204. An output interface of the filter stage 210 is coupled to an input interface of the A/D converter 206. Another input interface of the A/D converter 206 is coupled to the sample clock 212. The A/D converter 206 digitizes the output signal(s) generated by the tuner 204 in response to a sample clock signal produced by the sample clock 212. For example, the A/D converter 206 may produce both I and Q digital samples. Alternatively, the A/D converter 206 may produce narrow-band samples. In one embodiment of the invention, the A/D converter 206 employs multi-bit quantization for each of the generated samples. For example, the A/D converter 206 may produce 2-bit samples. Alternatively, the A/D converter 206 may comprise a 1-bit binary comparator.

Returning to FIG. 1, in response to a control signal from the control unit 104, the GPS front end 112 may be configured to capture digital samples over a particular time period to generate a set of digital samples. The time period may be predefined (e.g., a default time period) or may be set via the control signal from the control unit 104 (e.g., user selected time period). For example, the GPS front end 112 may capture several hundred milliseconds of data (e.g., 250 milliseconds). Each set of digital samples may be associated with a digital photograph captured by the imaging unit 102. Thus, the memory 106 may store pairs of a digital photograph and a set of digital samples. Notably, the GPS front end 112 only generates samples of GPS signals, and does not locate position of the digital camera 100. To locate position, the samples produced by the GPS front end 112 may be processed at a later time by an off-line processing device, such as a computer.

The clock 110 is configured to track time-of-day and may be used to provide a time-tag for each set of digital samples generated by the GPS front end 112. For example, the clock 110 may be a real-time clock (RTC). In one embodiment, the clock 110 is configured to provide an approximate time-of-day. For example, the clock 110 may track GPS time to within two seconds or better. The clock 110 may be periodically calibrated by an off-line processing device, such as a computer. As described below, each of the time-tagged sets of digital samples may be externally processed by a computer to produce a position result.

Figure 4:
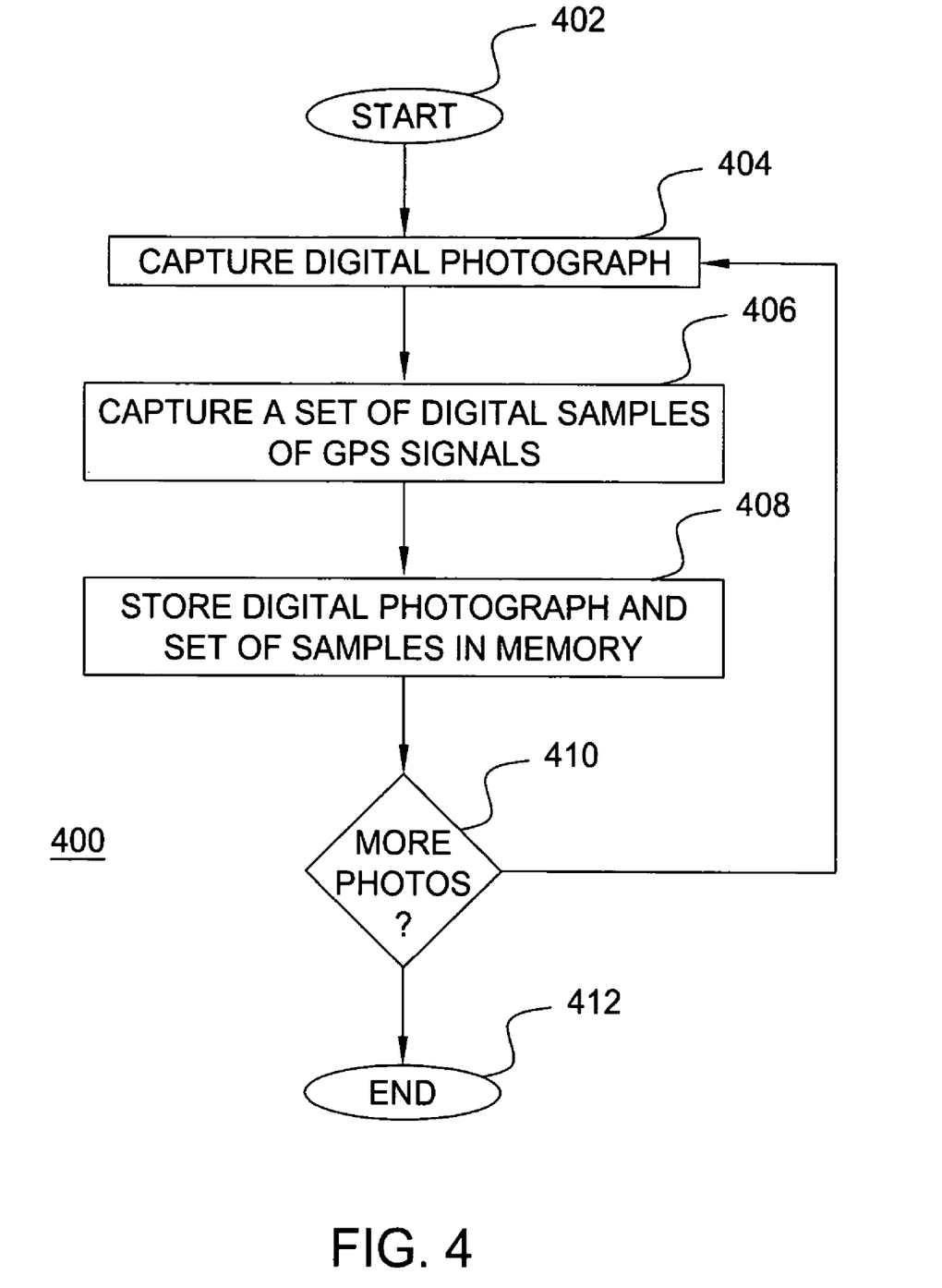
FIG. 4 is a flow diagram depicting an exemplary embodiment of a process for tagging digital photographs with geographic location data in accordance with one or more aspects of the invention.

FIG. 4 is a flow diagram depicting an exemplary embodiment of a process 400 for tagging digital photographs with geographic location data in accordance with one or more aspects of the invention. Aspects of the process 400 may be understood with reference to FIG. 1. The process 400 begins at step 402. At step 404, a digital photograph is captured by the imaging unit 102 of the digital camera 100. At step 406, a set of digital samples of GPS signals is captured by the GPS front end 112 of the digital camera 100. The GPS signal samples may be complex samples or narrow-band samples. The steps 404 and 406 may be performed contemporaneously. At step 408, the digital photograph and the corresponding set of digital samples are stored in the memory 306. At step 410, a determination is made as to whether more digital photographs are to be captured. If so, the process 400 returns to step 404 and repeats. Otherwise, the process 400 proceeds to end step 412.

Figure 3:
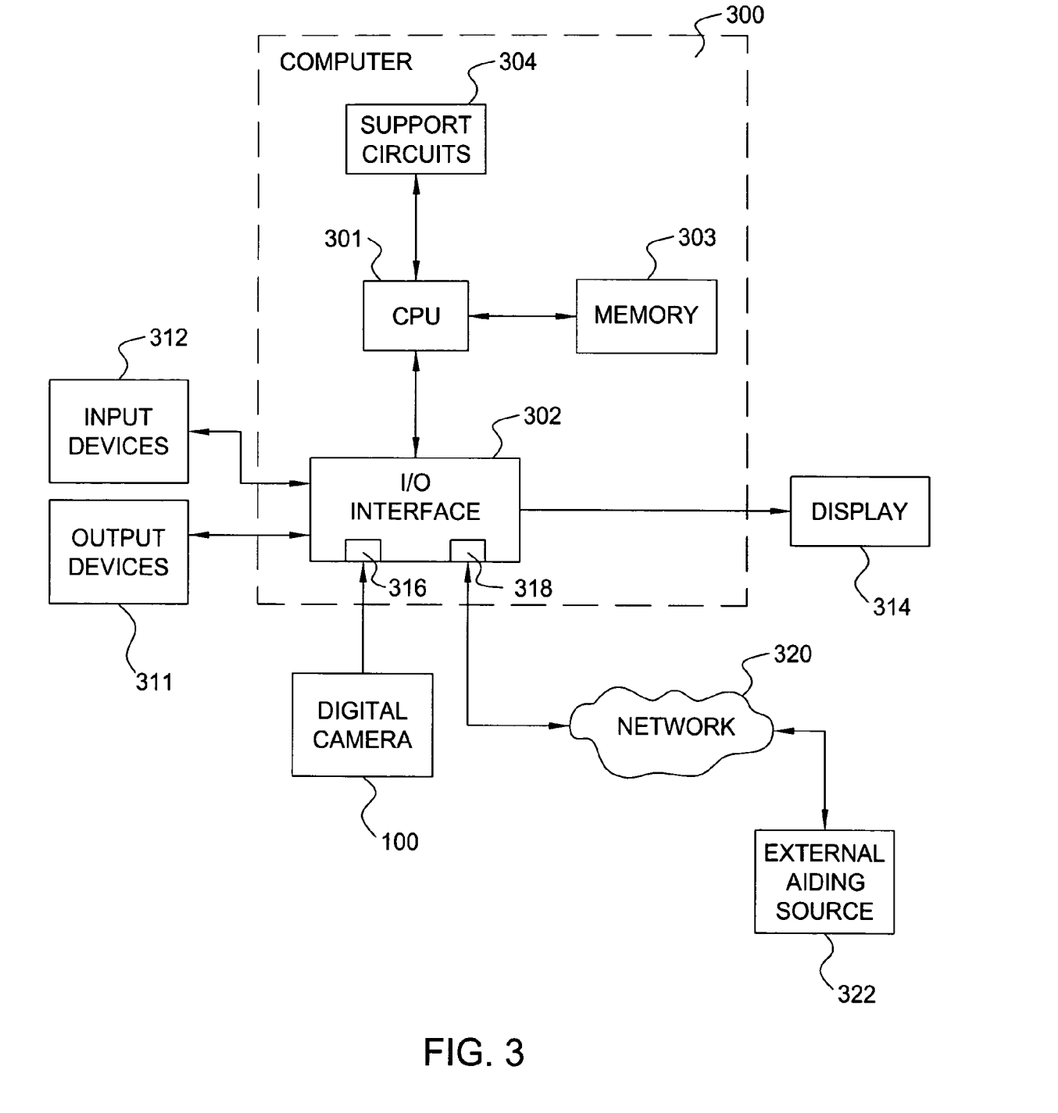
FIG. 3 is a block diagram depicting an exemplary embodiment of a computer suitable for processing data stored within the digital camera of FIG. 1.

FIG. 3 is a block diagram depicting an exemplary embodiment of a computer 300 connected to a network 320. The computer 300 is suitable for processing data stored within the digital camera 100 of FIG. 1. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, display, and the like, as well as a display 314.

The I/O interface 302 includes a communications port 316 for communicating with the data port 108 of the digital camera 100. The communications port 316 may comprise any type of port known in the art, such as a serial port, a USB port, an IEEE 1394 Firewire port, an infrared port (e.g., IrDA port), and an RF port (e.g., BLUETOOTH port). Notably, the computer 300 may retrieve digital photograph data and GPS digital sample data from the memory 106 of the digital camera 100 using the communications port 316. The I/O interface 302 also includes a communications port 318 for communicating with a network 320. For example, the communications port 318 may be an Ethernet port or like-type network port known in the art. The computer 300 may retrieve satellite orbit trajectory data (e.g., ephemeris data, almanac data, and the like) from an external aiding source 322 via the network 320. For example, the computer 300 may receive the satellite orbit trajectory data over the Internet from a web server. The external aiding source 322 may comprise or be in communication with a network of satellite tracking stations that collect data from the satellite navigation messages broadcast by the GPS satellites, as is well-known in the art. As described below, the satellite orbit data is required to locate position using the GPS digital samples.

The memory 303 may store all or portions of one or more programs and/or data to implement the processes and methods described herein. Notably, the memory 303 may store software 350 for processing digital samples of GPS signals and produce position results from the processed samples. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

Figure 5:
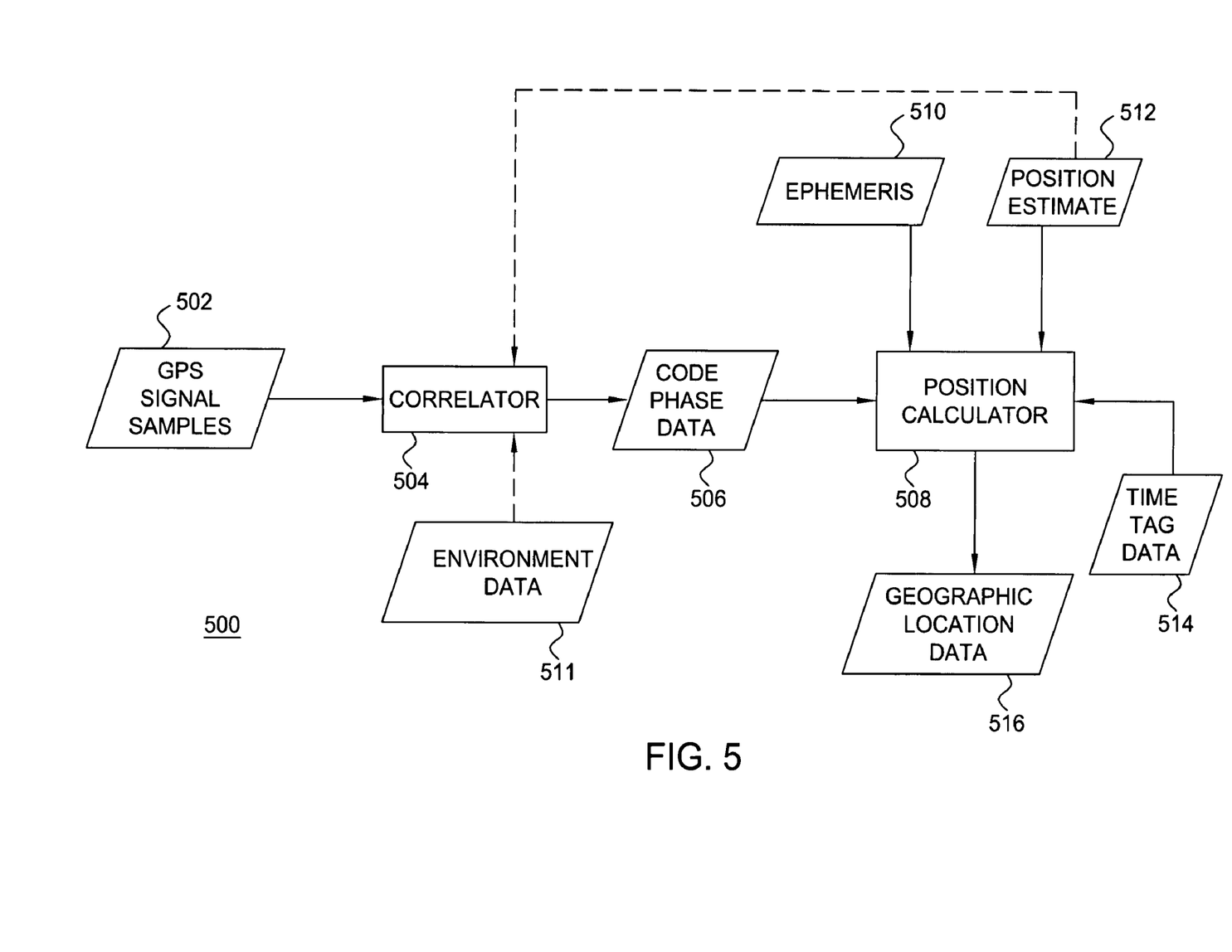
FIG. 5 is a flow diagram depicting an exemplary embodiment of a process for computing geographic location data from stored GPS signal samples.

FIG. 5 is a flow diagram is a flow diagram depicting an exemplary embodiment of a process 500 for computing geographic location data from stored GPS signal samples. The process 500 may be implemented as software stored in the memory 303 and executed by the CPU 301 of the computer 300 shown in FIG. 3. Alternatively, the process 500 may be implemented in hardware or a combination of hardware and software. The process 500 begins with stored GPS signal samples 502 that are received from the camera 100 for processing. The GPS signal samples 502 may be complex signal samples or narrow-band samples, as described above.

At step 504, the GPS signal samples 502 are processed by a correlator 504 to produce code phase data 506. The code phase data 506 comprises sub-millisecond time shifts between PN code signal sequences represented by the GPS signal samples and reference PN signal sequences. As is well known in the art, the code phase data 506 provides sub-millisecond portions of pseudoranges to the GPS satellites represented by the GPS signal samples 502. An exemplary embodiment of a correlation process is described below with respect to FIG. 6. In one embodiment, the correlator 504 may use a position estimate 512 to assist in computing the code phase data 506. Notably, the position estimate 512 may be used with the ephemeris 510 to generate expected code phase data (i.e., expected pseudorange data). The correlator 504 may use the expected code phase data to reduce the code phase search space (i.e., search window), and hence processing time, while computing the code phase data 506. Notably, in order to restrict the code phase search windows, the correlator 504 must first solve for or estimate the approximate receiver clock bias (i.e., common mode error), since such receiver clock bias is initially unknown. As is well known in the art, approximate receiver clock bias may be estimated using data from one or two satellite signals.

In addition, the correlator 504 may receive environment data 511 to improve the correlation process. Notably, the environment data 511 may provide knowledge of whether the photograph associated with the GPS signal samples 502 was taken in an outdoor environment versus an indoor environment. The correlator 504 may vary correlation parameters, such as coherent and non-coherent integration times, in response to the environment data 511. For example, if the environment data 511 provides an indication that the GPS signal samples 502 were captured in an indoor environment, the correlator 504 may increase the non-coherent integration period from a nominal period in order to increase the signal-to-noise ratio. The environment data 511 may be derived by analyzing the digital photograph associated with the GPS signal samples 502. For example, the digital photograph may be processed to determine the lighting or other photographic parameters that indicate the type of environment in which the camera 100 captured the photograph. In another example, whether or not a flash in the camera 100 was used to take the digital photograph may be used to indicate whether the camera 100 was in an indoor versus an outdoor environment.

At step 508, the code phase data 506, ephemeris data 510, a position estimate 512, and time-tag data 514 are processed by a position calculator 508 to produce geographic location data 516. The ephemeris data 410 includes satellite trajectory information and is well-known in the art. The time-tag data 514 includes an approximate time-of-day at which the GPS signal samples 502 were captured by the camera 100 (e.g., the time-tag provided by the clock 110). Notably, due to memory constraints in the camera 100, the GPS signal samples 502 may not contain enough information to locate and decode the TOW in the satellite navigation message. As is well known in the art, to decode TOW, at least six seconds of samples must be captured by the camera 100. However, the camera 100 may be configured to capture less than one second (e.g., 250 milliseconds) of data due to size constraints of the memory 106.

The position estimate 512 provides an approximate position of the camera 100 at which the GPS signal samples were captured. In one embodiment, for the GPS signal samples 502 associated with a current photograph, the position estimate 512 may be derived from geographic location data computed from GPS signal samples associated with a previous photograph. The length of time elapsed between the current and previous photograph (determined from the time-tag data) may be used to determine whether the previous geographic location data may be used as a valid approximate position for the position estimate 512. Alternatively, the position estimate 512 may be the location of the user's home address or a region of operation (e.g., state or country of operation).

In one embodiment, at step 508, the code phase data 506, the ephemeris data 510, the time-tag data 514, and the position estimate 512 are processed using a mathematical model to produce the geographic location data 516. Notably, the position calculator 508 computes the integer portions of the pseudoranges using the ephemeris data 510, the time-tag data 514, and the position estimate 512. The computed integer portions are combined with the code phase data 506 to compute full pseudoranges. The process for resolving integer millisecond ambiguities is well-known in the art. An exemplary process for resolving integer millisecond ambiguities is described in commonly-assigned U.S. Pat. No. 6,734,821, issued May 11, 2004, which is incorporated by reference herein in its entirety.

A mathematical model is used to relate a residual difference between the actual pseudoranges and expected pseudoranges to updates of position (e.g., x, y, and z position) and time (e.g., local clock bias ($t_c$) and time-of-day error ($t_s$)). The expected pseudoranges are based on the position estimate 512. In one embodiment, the mathematical model may be defined as follows:

$$\underline{u} = \begin{bmatrix} u_1 \\ u_n \end{bmatrix}$$

$$= \begin{bmatrix} \partial\rho_1/\partial x & \partial\rho_1/\partial y & \partial\rho_1/\partial z & \partial\rho_1/\partial t_C & \partial\rho_1/\partial t_S \\ \vdots & \vdots & \vdots & \vdots & \vdots \\ \partial\rho_n/\partial x & \partial\rho_n/\partial y & \partial\rho_n/\partial z & \partial\rho_n/\partial t_C & \partial\rho_n/\partial t_S \end{bmatrix} \begin{bmatrix} x \\ y \\ z \\ t_C \\ t_S \end{bmatrix}$$

$$= \begin{bmatrix} \partial\rho_1/\partial x & \partial\rho_1/\partial y & \partial\rho_1/\partial z & c & -\dot{\rho}_1 \\ \vdots & \vdots & \vdots & \vdots & \vdots \\ \partial\rho_n/\partial x & \partial\rho_n/\partial y & \partial\rho_n/\partial z & c & -\dot{\rho}_n \end{bmatrix} \begin{bmatrix} x \\ y \\ z \\ t_C \\ t_S \end{bmatrix}$$

$$= Hx$$

where: u is a vector of pseudorange residuals (the difference between the expected pseudoranges and the actual pseudoranges); and the H matrix contains the well known line-of-sight vectors (first three columns) relating the position updates (x,y,z) to the pseudorange residuals; a well known column of constants (c the speed of light) relating the local clock bias ($t_c$) to the pseudorange residuals; and a column of range rates relating the time-of-day error ($t_s$) to the pseudorange residuals. For a detailed understanding of the above-described mathematical model, the reader is referred to commonly-assigned U.S. Pat. No. 6,734,821. Several iterations of the above-described mathematical model may be executed to converge on a position. The process 500 may be repeated for each set of GPS signal samples retrieved from the camera 100.

Figure 6:
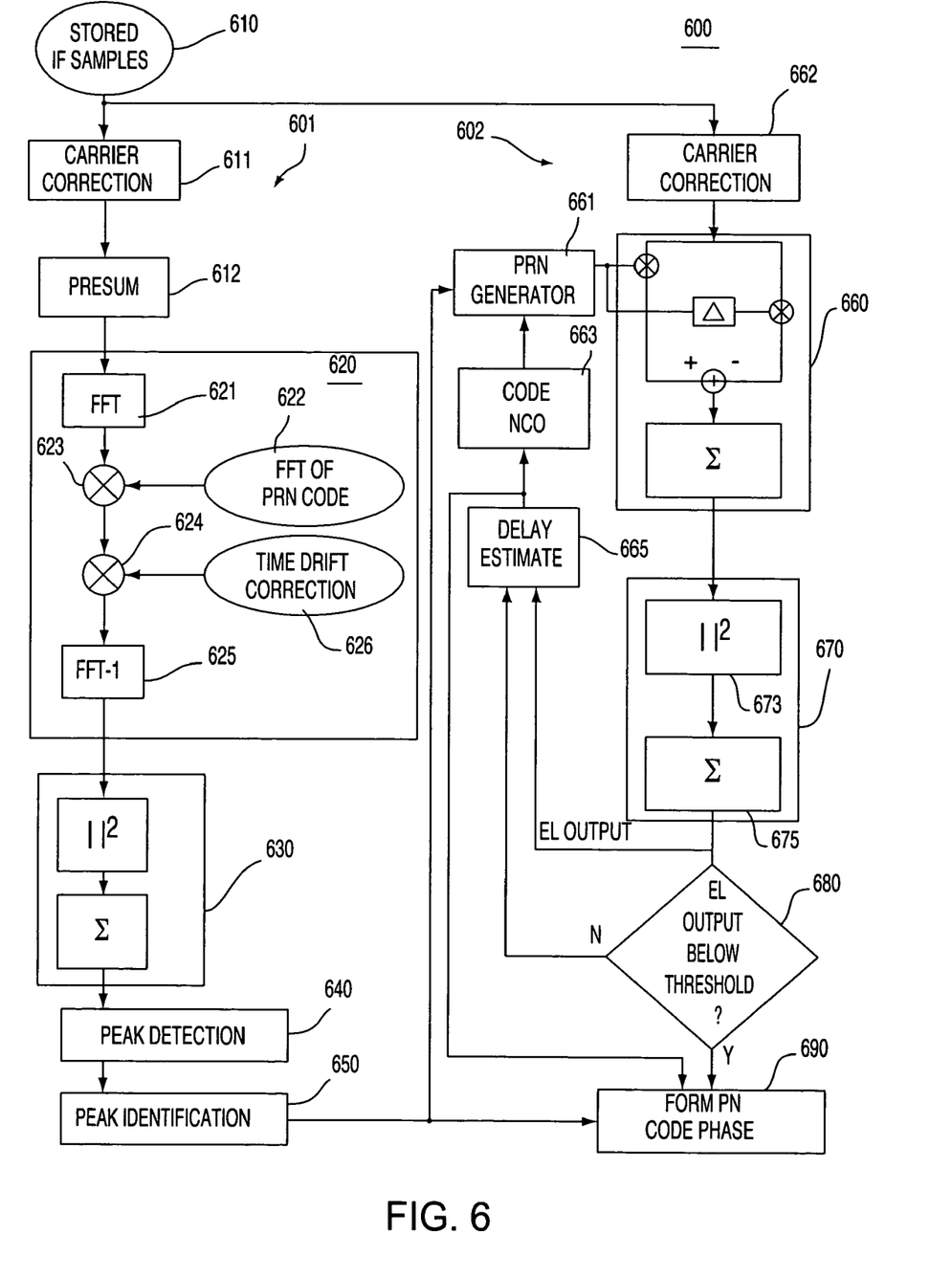
FIG. 6 is a flow diagram depicting an exemplary embodiment of a correlation process for use with the present invention.

FIG. 6 is a flow diagram depicting an exemplary embodiment of a correlation process 600 for use with the present invention. At step 602, stored GPS signal samples are received for processing. The GPS signal samples may be complex samples or narrow-band samples, as described above. The correlation process 600 may be used at step 504 of the process 500 shown in FIG. 5. The process 600 consists of two major processes: a signal detection process 601 and a signal measurement process 602. The signal detection process 601 determines the presence or absence of GPS signals and the approximate PN code phases for the signals. As discussed above, the PN code phases are used to determine the pseudoranges for locating position. Then, in the signal measurement process 602, the precise value of the PN code phase is determined.

The signal detection process 601 consists of several steps as outlined below. At step 611, the first phase involves applying a carrier frequency correction term. To apply the correction, the input samples are multiplied by a complex exponential term equal to the complex conjugate of the carrier frequency correction. The carrier frequency correction term compensates for Doppler (i.e., the apparent shift in frequency of the GPS signals due to satellite motion and receiver motion) and the nominal tuning offset inherent in the GPS front end 112.

At step 612, the input samples are pre-summed prior to processing to improve the signal-to-noise ration (SNR) and to reduce the processing burden. The pre-sum operation takes advantage of the fact that GPS signals consist of at least twenty identical epochs (each epoch consisting of a full cycle of the PN code and twenty epochs being the data bit period of the satellite navigation message). Samples taken at the same relative position within small groups of succeeding epochs can be summed to yield a single set of samples representative of all epochs. In one embodiment, the pre-summing operation is performed over groups of nine epochs, a value which ensures that data bit transitions on the GPS carrier will usually not affect the pre-summed quantities. By contrast, pre-summing over longer periods would tend towards zero due to the data bit transitions.

A convolution operation (multi-step process 620) is then performed to identify points of correlation between the input signal and the known satellite signal. While this convolution can be performed by a variety of techniques, an FFT based approach, commonly known as a fast convolution, is computationally efficient. More specifically, the fast convolution process 620 begins by performing an FFT at step 621 on the block of input samples. At step 623, the result is multiplied by the FFT of the PN code waveform 622. Then, at step 624, the process 600 multiplies the product by a time drift correction 626. At step 625, an inverse FFT of the result is computed to obtain the desired convolution. To save computational load, the FFT of the PN code for all satellites is pre-computed and stored in the memory 303 of the computer 300.

To improve SNR, the results of many fast convolutions are summed in a non-coherent integration step 630 by summing the magnitude square of the individual convolutions. The result is an improved SNR magnitude squared estimate of the convolution. The non-coherent integration step 630 requires that the individual convolutions be time aligned to account for the drift of the PN code between the pre-summed groups. The expected time drift between each pre-sum group may be computed because the expected code frequency is known for the search (the code frequency will always be 1/1540 of the carrier frequency). The time drift is conveniently compensated for during the convolution operation by applying a time drift correction 626 during step 624. In step 624, the transform domain representation of the convolution is multiplied by a complex exponential with a linear phase characteristic, which has the effect of shifting the convolution output in time. As each group is processed, the slope of the linear phase term in step 626 is increased to compensate for the expected time shift of the PN code relative to the first group. Thus, in this manner, all the convolution outputs will be approximately aligned in time and may be summed. In one embodiment, the length of the non-coherent integration step 630 is determined using environment data (e.g., indoors versus outdoors). For example, the non-coherent integration period may be increased from a nominal period if environment data indicates that the IF samples 610 were captured in an indoor environment (e.g., a low SNR environment).

The non-coherent integration is followed by step 640, wherein a peak detection is performed in which the results of the non coherent integration are scanned for correlation peaks. The resulting list of peaks is further analyzed during peak identification at step 650. The list is stripped of false peaks that may result from correlation sidelobes. It should be noted that the fast convolution and peak identification technique of the process 600 is intended only to identify the approximate delay value for the satellite, e.g. the approximate peak location. To obtain better accuracy, the process 600 proceeds to the signal measurement process 602. The signal measurement process 602 makes a precise measurement of the delay value for the satellite, e.g., the exact peak location is determined.

The signal measurement process 602 begins with the original stored IF samples and then, at step 662, proceeds with a carrier correction step that is methodically identical to 611. The output of the carrier correction step is coupled to an early-late (E-L) correlator 660. The carrier corrected IF samples are multiplied by both early and late versions of the PN reference code generated by the PN generator of step 661. The early and late products are differenced to form an early-minus-late signal that is accumulated for samples spanning several epochs. The complex magnitude squared value of the accumulator output is formed at step 673, and these values are further accumulated over a longer time span in the non-coherent accumulator at step 675. The result is a well averaged value of the E-L correlation.

The accumulations leading to the E-L output consist of both coherent summation and non-coherent (magnitude square) summation. In one embodiment, the coherent summation interval is chosen as nine epochs. This value is short enough to ensure that data bit transitions due to the GPS navigation message will not cause significant loss when averaged (see discussion above). Furthermore, limiting the coherent averaging time relaxes the requirement that the carrier correction process be highly accurate.

The PN generator of step 661 produces the reference code used in the early-late correlator 660. Initially, the code offset, e.g., the starting position of the code relative to the stored input samples, is set to the value resulting from peak identification process of step 650. At step 663, the rate of code generation is set by the code numerically controlled oscillator (code NCO) to the expected code rate. The carrier rate and the code rate are proportional to each other according to the ratio of the Li frequency and the 1,023 Mhz C/A code chipping rate. Expected carrier and code rates may be determined using the ephemeris in conjunction with an estimated position and an approximate time-of-day. Depending on the accuracy of the expected carrier and code rates, it may be necessary to perform a search in frequency for several candidate frequencies, i.e. retry the signal measurement process 602 for various carrier corrections.

The averaged value of the E-L correlation is used to update the phase of the NCO, in order to achieve better alignment the PN code generator to the input signal. When the best alignment is achieved, the E-L correlator output value will be minimized. This phase updating of the NCO continues in an iterative fashion until the E-L correlator output value reaches an acceptably small level (i.e., the threshold value at step 680). Once reached, the delay estimate produced at step 665 is a considered the final value of the PN code phase that is output at step 690. In another embodiment, rather than E-L correlation, the delay estimate may be calculated by determining a set of correlation values across the correlation response and performing a curve-fit operation to fine the response triangle that best matches the data (i.e., the peak of the response triangle is an estimate of the true delay). For a more detailed understanding of GPS signal processing, the reader is referred to commonly-assigned U.S. Pat. No. 6,453,237, issued Sep. 17, 2002, which is incorporated by reference herein in its entirety.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WMS system, and the SBAS system, as well as combinations thereof.

While the foregoing is directed to illustrative embodiments of the present invention, other and further embodiments of the invention may be devised without departing from the basic scope thereof, and the scope thereof is determined by the claims that follow.

The invention claimed is:

1. A digital camera, comprising:
   an imaging unit for generating digital photographs;
   a front end for receiving satellite positioning system signals from one or more satellites and digitizing said satellite positioning system signals from the one or more satellites; and
   a memory for storing said digitized satellite positioning system signals from the one or more satellites with each digital photograph generated by said imaging unit, wherein said digitized satellite positioning system signals stored in said memory with each digital photograph comprises in-phase samples and quadrature samples;
   a data port configured to communicate with said memory; and
   a computer, coupled to said data port, for retrieving at least one digital photograph and corresponding said digitized satellite positioning system signals from said memory and for processing said digitized satellite positioning signals retrieved to produce location data, wherein said computer is configured to correlate the digitized satellite positioning system signals retrieved from said memory with pseudorandom reference codes to produce pseudorange data; and
   wherein the digitized satellite positioning system signals do not include location.

2. The digital camera of claim 1, further comprising:
   a control unit for instructing said imaging unit to capture a digital photograph and for instructing said front end to capture said digitized satellite positioning system signals.

3. The digital camera of claim 1, further comprising:
   a clock for tracking time-of-day;
   wherein a time-of-day value generated by said clock is stored with said digitized satellite positioning system signals in said memory.

4. The digital camera of claim 1, wherein said front end comprises:
   an antenna;
   a tuner, coupled to said antenna, for translating said satellite positioning system signals to an intermediate frequency; and
   an analog-to-digital converter for digitizing said translated satellite positioning system signals to produce said digitized satellite positioning system signals.

5. A system for organizing digital photographs, comprising:
   a digital camera, comprising:
   an imaging unit for generating digital photographs;
   a front end for receiving satellite positioning system signals and digitizing said satellite positioning system signals;
   a memory for storing said digitized satellite positioning system signals with each digital photograph generated by said imaging unit; and
   a data port configured to communicate with said memory; and
   a computer, coupled to said data port, for retrieving at least one digital photograph and corresponding said digitized satellite positioning system signals from said memory and for processing said digitized satellite positioning signals retrieved to produce location data, wherein said computer is configured to correlate the digitized satellite positioning system signals retrieved from said memory with pseudorandom reference codes to produce pseudorange data.

6. The system of claim 5, wherein said computer is configured to adjust one or more correlation parameters in response to environment data associated with said at least one digital photograph.

7. The system of claim 5, wherein said computer includes a communication port configured for communication with a network, and wherein said computer is configured to receive satellite trajectory data from said network.

8. The system of claim 7, wherein said computer is further configured to compute position data in response to said pseudorange data and said satellite trajectory data.

9. The system of claim 8, wherein said computer is configured to compute said position data using a mathematical model relating said pseudorange data and said satellite trajectory data to updates of position and time variables.

10. A method, comprising:
    generating one or more digital photographs at a digital camera;
    generating one or more sets of digitized satellite positioning system signals from a plurality of satellite positioning system signals from one or more satellites at said digital camera;
    respectively storing said one or more sets of digitized satellite positioning system signals from one or more satellites with said one or more digital photographs in a memory;
    retrieving said one or more digital photographs and said one or more sets of digitized satellite positioning system signals from said memory; and
    correlating each of said one or more sets of digitized satellite positioning system signals with a pseudorandom reference code to produce pseudorange data.

11. The method of claim 10, wherein each of said one or more sets of digitized satellite positioning system signals comprises in-phase samples and quadrature samples.

12. The method of claim 10, further comprising:
    storing a time-of-day value with each of said one or more sets of digitized satellite positioning system signals.

13. The method of claim 10, wherein said step of generating said one or more sets of digitized satellite positioning system signals comprises:
    translating said satellite positioning system signals to an intermediate frequency; and
    digitizing said translated satellite positioning system signals.

14. The method of claim 10, further comprising:
    adjusting one or more correlation parameters in response to environment data associated with one or more digital photographs.

15. The method of claim 10, further comprising:
    receiving satellite trajectory data from a network; and
    computing position data in response to said pseudorange data and said satellite trajectory data.

16. The method of claim 15, wherein said step of computing position comprises:
    relating said pseudorange data and said satellite trajectory data to updates of position and time variables using a mathematical model.

* * * * *